April 22, 1958  A. A. E. POUZOULET  2,831,517
PEELING MACHINE
Filed June 29, 1954  3 Sheets-Sheet 1
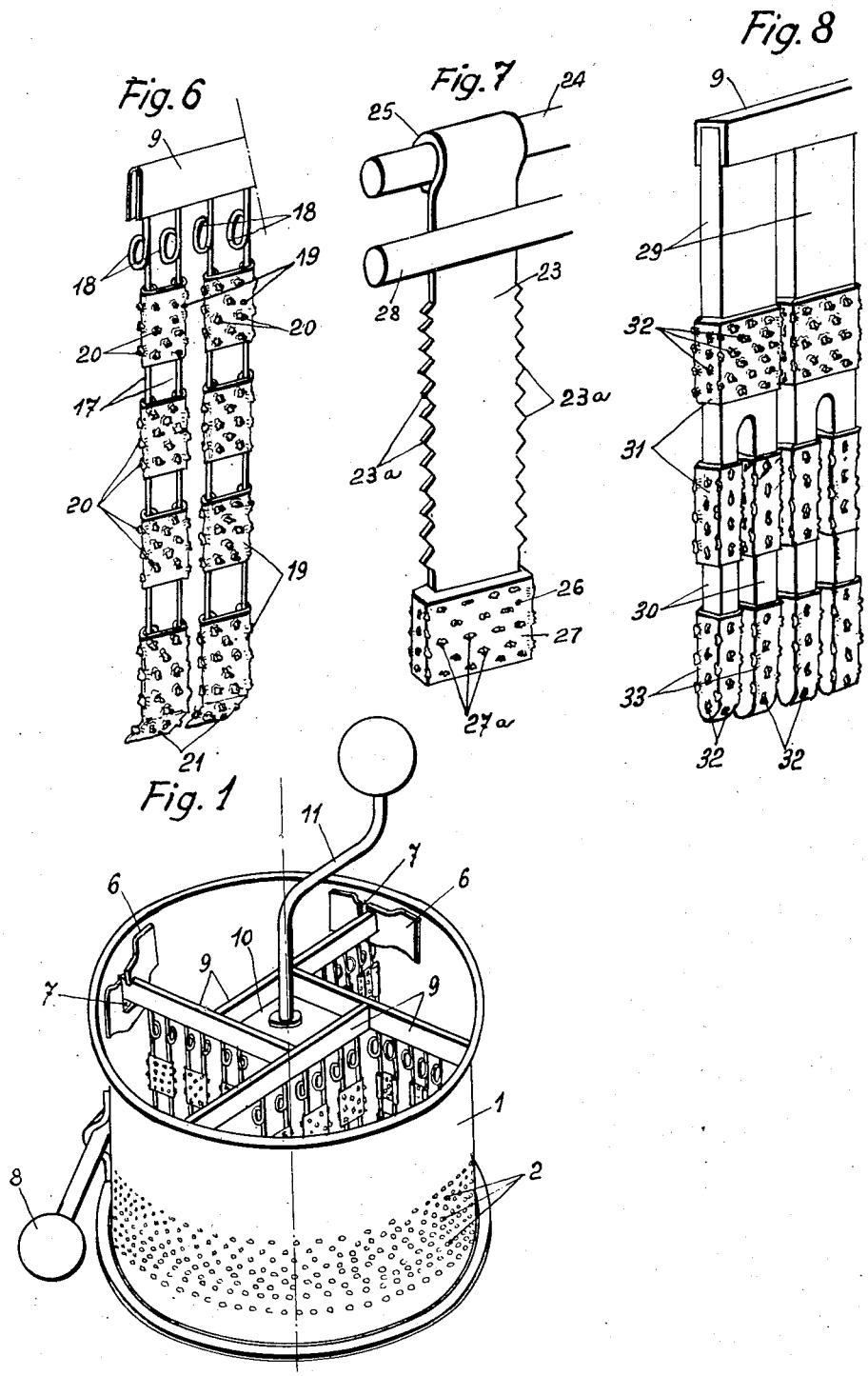

April 22, 1958  A. A. E. POUZOULET  2,831,517
PEELING MACHINE
Filed June 29, 1954  3 Sheets-Sheet 2
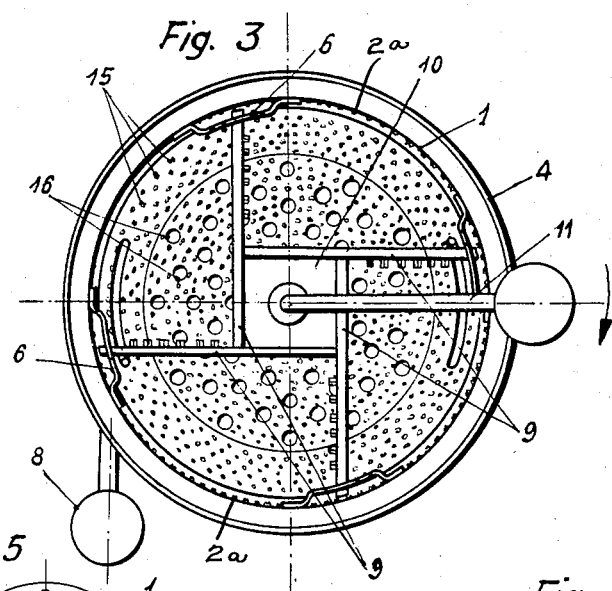
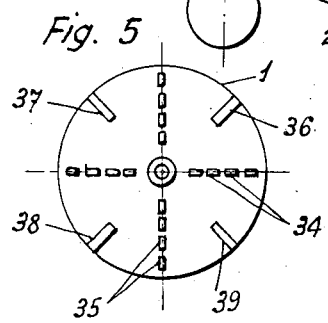
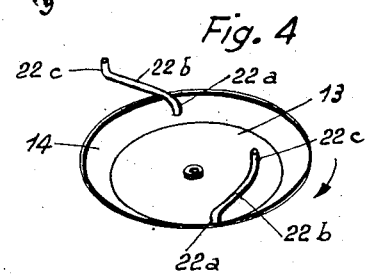
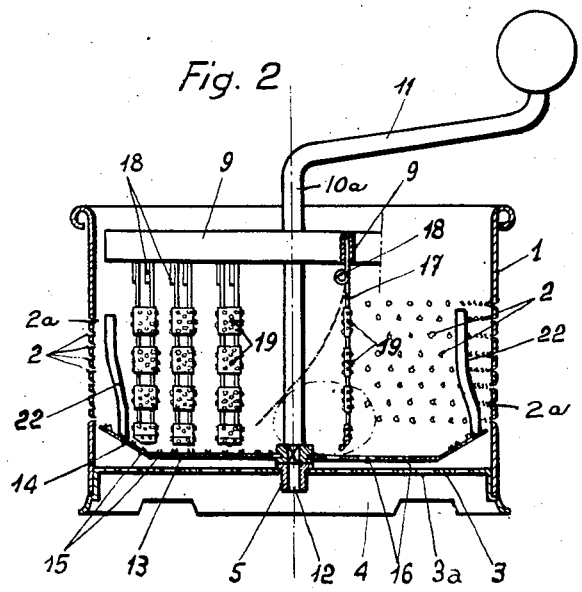

April 22, 1958 A. A. E. POUZOULET 2,831,517
PEELING MACHINE
Filed June 29, 1954 3 Sheets-Sheet 3
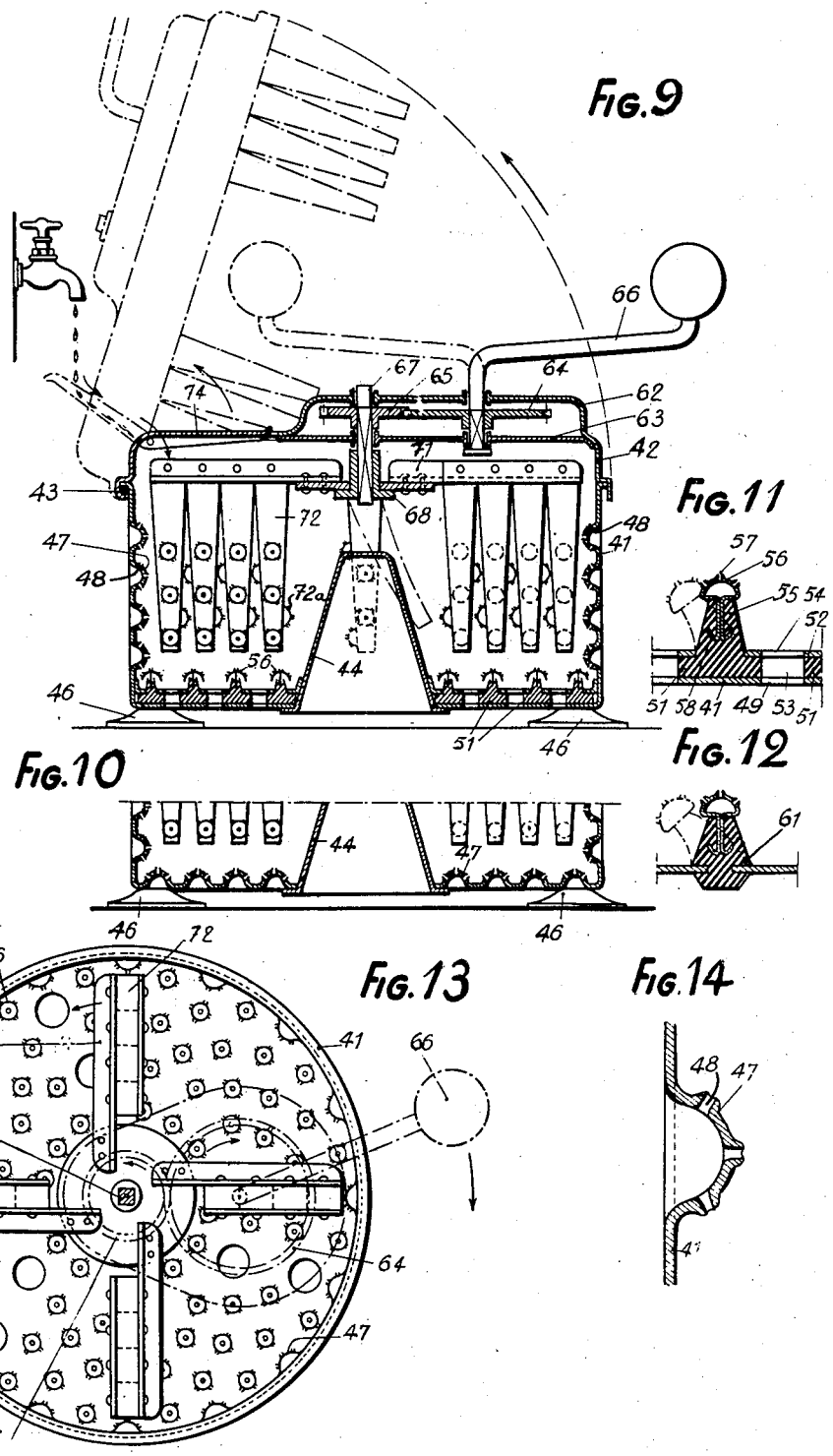

United States Patent Office 2,831,517
Patented Apr. 22, 1958

2,831,517

PEELING MACHINE

André Auguste Edmond Pouzoulet, Paris, France, assignor to Société d'Etude et d'Exploitation Chimie et Mecanique, E. C. E. M., Bagnolet, Seine, France Application June 29, 1954, Serial No. 440,209

Claims priority, application France July 8, 1953

2 Claims. (Cl. 146—49)

My invention relates to a machine for peeling various products, chiefly foodstuffs, such as fruit, vegetables, roots and tubers.

My invention has for its object a machine which ensures the effective peeling of various products, chiefly fruit, vegetables, roots and tubers, by removal of a very thin layer of material which is substantially constant throughout the periphery of the product.

In the following description, I will always, refer, for the sake of simplicity, to vegetables but it should be understood that the machine, according to my invention, is by no means limited to this sole embodiment.

The peeling machine according to my invention includes a cylindrical container associated with peeling members or projections suspended at their upper ends and extending inside the container along radial planes, the peeling members being elastically deformable in transverse directions with reference to the radial plane, while means are provided for imparting a relative rotary movement to the peeling members with reference to the bottom of the container, at least one of the following parts viz. the inner wall of the cylindrical container, the bottom of the said container, and the peeling system, being covered by abrasive projections.

The peeling members are adapted to cause the vegetables to rock and to roll and by reason of the different sizes of the different vegetables, the peeling members produce an actual stirring of the whole mass, Thus, the contacting points between the skin to be removed and the different abrasive surfaces adapted to wear the skin off, are multiplied and the outer ends of the peeling members play the part of scrapers engaging the recesses at the surface of the vegetables.

In a preferred embodiment, the bottom of the container is defined by a plate which may assume, with reference to the cylindrical wall of the container, a relative movement at a comparatively reduced speed. In this case, the peeling members are preferably hung perpendicularly to the bottom of the container from a common support secured to the upper end of the cylindrical container.

In a further embodiment, the peeling members are carried by radial arms secured to a central spindle adapted to be rotated while the bottom of the container is stationary.

Preferably, the central spindle which is rigid with the radial arms carrying the peeling members, is mounted in a cover fitted over the upper part of the container.

According to a particular arrangement, the central part of the bottom of the container is capped by a chimney or like frustoconical member which extends over a substantial fraction of the height of the container so as to define, with the cylindrical wall of the container, an annular space adapted to receive the products to be peeled.

Other features and advantages of my invention will appear both from the description and the accompanying drawings wherein:

Fig. 1 is a perspective view of a first embodiment of a peeling machine according to my invention;

Fig. 2 is an axial cross-sectional view, partly in elevation, taken approximately along the line 2—2 of Fig. 1;

Fig. 3 is a top plan view of the machine shown in Figs. 1 and 2;

Fig. 4 is a diagrammatic view of a portion of the machine, showing the arrangement of releasing means;

Fig. 5 is a diagrammatic plan view showing two groups of peeling members arranged in two orthogonal planes;

Fig. 6 is a perspective view of one construction of the peeling member;

Fig. 7 is a similar view of another peeling-member construction;

Fig. 8 is a perspective view of a further peeling-member construction;

Fig. 9 is a vertical axial cross-section of a second embodiment of my improved peeling machine, Fig. 10 is a fragmentary vertical sectional view of a modified form of bottom for the container of the machine illustrated in Fig. 9;

Fig. 11 illustrates on a larger scale a detail of the bottom of the machine illustrated in Fig. 9.

Fig. 12 illustrates on a larger scale a corresponding detail of the machine bottom shown in Fig. 10.

Fig. 13 is a top plan view of the machine illustrated in Fig. 9 after removal of the cover.

Fig. 14 shows on a larger scale a detail of the cylindrical wall of the container shown in Figs. 9 and 13.

Turning to Figs. 1 to 3 of accompanying drawings, 1 designates the stationary shell or drum of the machine which is provided in its lower section with perforations 2 the inwardly projecting edges 2a of which act as abrasive elements. The shell is provided with a perforated bottom 3 formed with openings 3a rigid with a flange 4 forming a foot for the machine and carrying a central bearing 5. The inner wall of the shell carries in its upper section four small horizontal bridge members 6 provided each with a bayonet slot 7.

These bayonet slots are adapted to carry and to lock the ends of four bars 9 forming two sets of parallel bars, the two sets being perpendicular to each other. The bars 9 carry the peeling members to be described hereinafter and the inner ends of the bars are rigid with a plate 10 engaged in its center by the vertical spindle 10a of a crank 11 the lower end 12 of which is rotatably carried inside the bearing 5 and is rigid with a plate 13 provided with an upwardly bent edge 14. Said plate 13 and its bent edge are both provided with abrasive projections 15. The plate 13 is provided furthermore with perforations 16 adapted to provide for the exhaust of the washing water laden with peelings and like waste-material. The edge 14 of the plate 13 is rigid with two releasing members 22 arranged in diametrically opposed relationship and each defined (Fig. 4) by a rigid wire of mild steel shaped so as to include a lower section 22a which is substantially parallel with the axis of the machine; the lower section is followed by a helical sloping section 22b disposed substantially at 45° with reference to the horizontal plane and directed rearwardly i. e. opposite the direction of rotation illustrated by the arrow, said sloping section merging in its turn into the end section 22c parallel with the axis of the machine.

It is apparent that the upwardly directed slope 22b produces a release of the wedged vegetables inside the drum while the part 22c parallel with the upper axis following the slope drives the vegetables away so as to prevent them from being wedged between the bars carrying the peeling members and the upper part of the shell.

The peeling members used in the above described machine are illustrated in full detail in Fig. 6. Each of said members is defined by two wires 17 made of spring steel or by a single wire folded so as to form two parallel strands and the ends of which are held fast between the two sections of a metal sheet folded into the shape of a strap and forming one of the small bars 9 referred to above. This wire or these wires 17 form in the vicinity of the strap 9 at least one loop 18 which prevents the peeling members from being submitted to a permanent deformation by reason of stresses rising beyond their elastic limit. The lower ends of the wires are shifted forwardly as shown at 21 in the direction of progression in the shell. These lower ends of the single wires are interconnected two by two by rectangular metal sheets 19 provided with slashes the edges 20 of which form abrasive parts.

In the modification illustrated in Fig. 7 a rigid blade 23 provided with lateral teeth 23a is wound at 25 around a spindle 24 so as to be capable of rocking with reference to the latter; the outer end of the blade carries a small weight 26 enclosed inside a metal sheet 27 with slashes 27a forming the abrasive part; said weight returns the blade 23 into its vertical position whenever it has been shifted out of the latter by a vegetable propelled by the rotary plate 13. A stop 28 limits the rocking movement of the blade 23 against the direction of progression in the shell 1.

In the further modification illustrated in Fig. 8, the peeling members are defined by small vertical bars 29 made of rubber or a derivative or substitute thereof. Said bars are clamped at one end inside the upper strap 9 while their lower ends are subdivided into two parallel sections 30 so as to improve their flexibility. Outer linings 31 provided with slashes 32, forming the abrasive parts, encase partly the small rods 29 and their lower arms 30 while the lower ends of the latter are capped by means of covers 33 provided with similar slashes 32. As already mentioned, these rows of peeling members extending in a direction substantially perpendicular to the rotary plate may advantageously be associated with groups of similar members having a different angular setting.

Turning now to Fig. 9 which illustrates a further embodiment of a peeling machine according to the invention, it is seen that said machine includes a cylindrical container 41 having a vertical axis; said container is provided with a cover 42 hinged to the upper part of the container at 43. The bottom of the container 41 is perforated and it is provided centrally with a perferably frustoconical chimney 44 which may be welded or riveted to the container bottom and which extends over a large fraction of the height of the container 41 so as to define with the cylindrical wall of the container an annular space adapted to receive the vegetables or like material to be peeled.

The lower surface of the bottom of the container 41 carries at least three suction grip feet 46 serving as supports for the machine. The inner surface of the cylindrical wall of the container is lined with abrading bosses defined in the case illustrated by stamped parts 47 provided with perforations 48 the edges of which form burrs as shown in detail in Fig. 14.

The bottom of the container is also lined with abrasive bosses which may be formed in the same manner as those of the cylindrical side wall of the container as illustrated in Fig. 10.

The abrasive bosses formed both on the side walls and on the bottom of the container may be made in any other suitable manner. Thus in Figs. 9 and 11, I have shown a further embodiment of such bosses. A plate 51 of rubber or like yielding material is carried by the bottom of the container 41 and is held in position by an auxiliary rigid plate 52. The rubber plate 51 and the rigid plate 52 are provided respectively with openings 53 and 54 in register with the perforations 49 in the bottom of the container 41. The yielding plate 51 is provided with studs 55 projecting upwardly through the plate 52 and the upper ends of which are recessed so as to be engaged each by the tail-piece of a stamped hemispherical metal fitting 56, the perforations in the outer surface of which form burrs 57. The tail end of each fitting may include two incurved lugs 58 forming anchoring tips retaining permanently the stamped member 56 at the tip of the corresponding stud 55.

Instead of being integral with a common yielding plate 51, the elastic studs may each be integral with a block 61 (Fig. 12) provided with a circular groove so as to be fitted with a force fit and held fast inside an opening provided in the bottom of the container.

The cover 42 of the container is provided with an upwardly stamped section forming a casing 62 closed by an inner plate 63 and adapted to enclose and to carry a speed-increasing gear including two toothed wheels 64, 65, keyed respectively to a control crank 66 and to a central shaft 67 rotatably carried inside the upper and lower walls of said casing.

To the shaft 67 is also secured a socket 68 carrying at least one pair of radial arms such as 71 (see also Fig. 13) which serve as carriers for the elastic peeling members 72. The shape and arrangement of these elastic peeling members may vary as desired and various embodiments thereof have been already described hereinabove. In all cases the peeling members 72 are suspended at their upper ends from the radial arms 71 and they are adapted to be deformed in a direction perpendicular to the radial planes containing their carrier arms. The members 72 are provided with abrasive portions 72a intended to produce the desired peeling effect on the foodstuff contained inside the container.

Lastly the cover 42 of the container is provided with a pivoting flap 74 which allows the introduction of water inside the machine during operation, i. e. while the cover closes the container, said arrangement also allowing control of the progression of the peeling operation.

The machine described hereinabove operates in the following manner.

The machine being laid on a sink, the cover is raised, the vegetables or like material to be peeled are poured into the container and the cover is closed.

The flap 74 being opened, the machine is positioned in a manner such that the jet of water from a tap may be directed over the open flap into the container. A downwardly directed pressure is then exerted on the machine so as to make the feet adhere to the sink and thus hold the machine fast. It is then sufficient to turn the crank 66 so as to produce a rotation of the arms 71 carrying the peeling members 72.

The speed-increasing gear provides for a greater rotary speed than that of the crank. It has been found, in fact that the speed ratio providing the best results is equal to about 2:5.

The peeling members carry the vegetables around with them but the movement of the latter is braked by the abrasive bosses 47 located both on the lateral cylindrical wall and on the bottom of the container so that the vegetables are driven substantially at the speed of rotation of the crank.

Since the vegetables progress consequently at a speed which is much lower than that of the peeling members, the latter are bent rearwardly and remain in contact with the vegetables to be peeled which exert a pressure thereon. Consequently they efficiently scrape the skin off the vegetables which are at the same time perfectly stirred.

When the peeling operation is at an end, which may be easily ascertained by looking through the opening uncovered by the flap 74, the cover 42 is raised and, after removal of the peeled vegetables, a further load may be introduced inside the machine. The part played by the central chimney consists in preventing the vegetables from lying inside an area adjacent the axis of the machine, in which area the linear speed of the peeling members would not be sufficient for efficient operation and therefore the machine is designed so that said members operate only inside an outer annular area.

Openings 49 formed in the bottom of the container allow the exhausting of the water and of the peelings carried along by the latter.

The efficiency of the machine according to the invention is due chiefly to the arrangement of the elastic peeling members which enter deeply into the container and are adapted to yield to the pressure exerted by the vegetables so that they exert a continuous frictional action on the surface of the vegetables while they match the curvature of their outer surfaces.

Obviously, my invention is by no means limited to the embodiments and details of execution described and illustrated. Thus, it is possible to provide an arrangement for clamping the cover over the container during the operation of the machine. It is also possible to substitute for the hinged cover illustrated a removable cover adapted to be mounted through the agency of a bayonet connection for instance. The cover may be made of transparent plastic material or of metal, in which latter case it is provided with a transparent window. Similarly, the abrasive bosses which are distributed inside the machine may be formed in any suitable manner other than those illustrated without thereby unduly widening the scope of the invention as defined in accompanying claims.

What I claim is:

1. A machine for peeling vegetables and like material comprising, in combination, a cylindrical container defining a peeling chamber adapted to contain the material to be peeled and having abrasive walls, a plurality of elongated yieldable peeling members extending into said chamber in parallel relationship with respect to the axis of the container, a support rotatably mounted around said axis and having radially-extending supporting arms for said members extending only in the upper portion of said chamber, said peeling members depending from said supporting arms and being secured thereto only at their upper ends, and each member being adapted to be bent in a plane perpendicular to the plane containing said member and its supporting arm.

2. A machine for peeling vegetables and like material comprising, in combination, a cylindrical container having a bottom and side walls defining a peeling chamber adapted to contain the material to be peeled and having abrasive walls, a plurality of elongated yieldable peeling members extending into said chamber in parallel relationship with respect to the axis of the container, a support rotatably mounted around said axis and having radially-extending supporting arms for said members extending only in the upper portion of said chamber, said peeling members depending from said supporting arms and being secured thereto only at their upper ends, and each member being adapted to be bent in a plane perpendicular to the plane containing said member and its supporting arm, and said bottom being provided with a plurality of elastic projections extending into said chamber for engagement with the material brought into contact with the peeling members, said projections having abrasive surfaces to effect a peeling action upon said material.

References Cited in the file of this patent

UNITED STATES PATENTS

| 100,348 | Williams | Mar. 1, 1870 |
| 1,351,711 | White | Aug. 31, 1920 |
| 1,637,830 | Mannsdorff | Aug. 2, 1927 |
| 1,681,737 | Lindahl | Aug. 21, 1928 |

FOREIGN PATENTS

| 610,408 | Great Britain | Oct. 15, 1948 |
| 616,833 | Great Britain | Jan. 27, 1949 |